US011439145B2

(12) United States Patent
Buchek et al.

(10) Patent No.: US 11,439,145 B2
(45) Date of Patent: Sep. 13, 2022

(54) AGRICULTURAL COMPOSITIONS CONTAINING STRUCTURED SURFACTANT SYSTEMS

(71) Applicant: Stepan Company, Northfield, IL (US)

(72) Inventors: Kelly Buchek, Mundelein, IL (US); Eric M. Weber, Arlington Heights, IL (US); Elodie Shaw, Fontaine (FR); Krista L. Turpin, Loganville, GA (US); Andrea B. E. Brayton, Wheeling, IL (US); Julien Guillan, Voreppe (FR); Dave R. Allen, Chicago, IL (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 16/790,445

(22) Filed: Feb. 13, 2020

(65) Prior Publication Data
US 2020/0178523 A1 Jun. 11, 2020

Related U.S. Application Data

(63) Continuation of application No. PCT/US2018/046631, filed on Aug. 14, 2018.

(60) Provisional application No. 62/547,440, filed on Aug. 18, 2017, provisional application No. 62/545,387, filed on Aug. 14, 2017.

(51) Int. Cl.
| | | |
|---|---|---|
| A01N 25/30 | (2006.01) | |
| A01N 57/20 | (2006.01) | |
| C05G 3/60 | (2020.01) | |
| A01N 25/04 | (2006.01) | |

(52) U.S. Cl.
CPC ............ *A01N 25/30* (2013.01); *A01N 57/20* (2013.01); *A01N 25/04* (2013.01); *C05G 3/60* (2020.02)

(58) Field of Classification Search
CPC ........ A01N 57/20; A01N 25/30; A01N 25/04; C05G 3/60
See application file for complete search history.

(56) References Cited

U.S. PATENT DOCUMENTS

| | | |
|---|---|---|
| 5,547,918 A | 8/1996 | Newton et al. |
| 6,165,939 A | 12/2000 | Agbaje et al. |
| 6,200,586 B1 | 3/2001 | Lambie et al. |
| 6,642,178 B2 * | 11/2003 | Woznica ............... A01N 61/02 504/211 |
| 9,668,474 B2 | 6/2017 | Hawkins et al. |
| 2003/0125211 A1 | 7/2003 | Woznica et al. |
| 2006/0178441 A1 | 8/2006 | Hawkins |
| 2007/0293550 A1 * | 12/2007 | Rochling ............... A01N 47/36 514/361 |
| 2009/0137667 A1 | 5/2009 | Kabanov et al. |
| 2009/0318294 A1 * | 12/2009 | Malec |
| 2010/0234457 A1 | 9/2010 | Taranta et al. |
| 2012/0157312 A1 | 6/2012 | Krapp et al. |
| 2013/0137578 A1 | 5/2013 | Xu et al. |
| 2014/0348759 A1 * | 11/2014 | Hawkins ............... A01N 25/30 424/49 |
| 2015/0105254 A1 | 4/2015 | Li |
| 2015/0141251 A1 | 5/2015 | Dawson et al. |

FOREIGN PATENT DOCUMENTS

| | | |
|---|---|---|
| EP | 0388239 | 9/1990 |
| JP | H11255602 | 9/1999 |

OTHER PUBLICATIONS

The British Crop Protection Council; Brighton Crop Protection Conference—Weeds—1991, vol. 1, Nov. 1991, 8 pages.
Elsik et al.; "Agricultural Applications of Structured Surfactant Fomulations," Pesticide Formulations and Application Systems: 23rd International Symposium, Aug. 29, 2013, 10 pages.
International Searching Authority, "International Search Report and Written Opinion," issued in connection with International Patent Application No. PCT/US18/46631 dated Oct. 24, 2018, 15 pages.
Fecko, "Environmental Fate of Bifenthrin" Environmental Monitoring and Pest Management Branch, Department of Pesticide Regulation Sacramento, CA Dec. 28, 1999, 10 pages.
United States Environmental Protection Agency, "Label Amendment," 2011, 5 pages.
The Dow Chemical Company, "Product Safety Assessment—Acetochlor," Apr. 29, 2008, 6 pages.
Europe Patent Office, Partial supplementary European search report, Application No. 18847102.3 dated Jun. 4, 2021, 14 pages.

* cited by examiner

*Primary Examiner* — Johann R Richter
*Assistant Examiner* — Danielle Sullivan
(74) *Attorney, Agent, or Firm* — McAndrews, Held & Malloy, Ltd.

(57) ABSTRACT

Agricultural compositions that employ structured surfactant systems to suspend water-insoluble or sparingly soluble agricultural actives and/or adjuvants are disclosed. Also disclosed are agricultural compositions that combine structured surfactant systems with electrolytes to form structured electrolyte compositions. The structured surfactant systems, both with and without electrolyte, suspend one or more agricultural actives and/or crop oil and non-aqueous adjuvants to provide agricultural compositions that can combine combinations of actives in a single, stable composition.

8 Claims, 7 Drawing Sheets

FIG. 1

FIG. 2
RHEOLOGICAL CHARACTERIZATION
Atrazine 4L Structured SC

Atrazine 4L Xanthan SC

- Structured KIPA Glyphosate

- Combined generic KIPA Glyphosate formulation and Rapeseed COC

FIG. 7

FORMULATIONS 1, 2, 3

CONTROL 1-A, 2-A, 3-A

CONTROL 1-B, 2-B, 3-B

AGRICULTURAL COMPOSITIONS CONTAINING STRUCTURED SURFACTANT SYSTEMS

CROSS REFERENCE TO RELATED APPLICATIONS

This application is a continuation of PCT Application No. PCT/US2018/046631, filed Aug. 14, 2018, which claims priority to U.S. Provisional Application No. 62/545,387, filed Aug. 14, 2017, and U.S. Provisional Application No. 62/547,440, filed Aug. 18, 2017. The entire specifications of the provisional applications referred to above are hereby incorporated by reference.

FIELD OF THE INVENTION

The present technology relates to agricultural compositions that employ structured surfactants as rheology modifiers. In particular, the present technology relates to improved structured surfactant systems that can suspend high concentrations of agrochemical actives to form stable formulations. Advantageously the formulations can be diluted for use without sedimenting or phase separating.

BACKGROUND OF THE INVENTION

Agricultural compositions comprising agrochemical actives are widely used for controlling pests and/or for promoting the healthy growth of crops. Such compositions can be formulated as stable aqueous-based concentrates that are diluted with water prior to use and application. For these formulations, rheology modifiers or other suspension aids are added to the formulations to keep the actives in suspension and prevent settling.

Conventional rheology aids found in agricultural formulations have many limitations. Some pesticide actives are incompatible with xanthan gum, a common rheology modifier, and fail to solvate regardless of how much or how long shear is applied. Polysaccharides can also present incompatibilities when electrolytes are included in a formulation concentrate, or when the concentrate is diluted into a liquid fertilizer for application. In addition, low pH systems can cause compatibility issues with xanthan gum, even when an acid-stable grade of xanthan gum is used.

Some improvement in stability has been obtained by utilizing structured surfactants instead of polysaccharides to suspend water-insoluble agrochemical actives. Structured surfactant systems are based on the ability of surfactants and water to form phases that are neither liquids nor crystals; these are usually termed "liquid crystal phases," or alternatively "mesomorphic phases" or "mesophases." Lamellar liquid crystal phases and spherulitic phases form at high concentrations of selected surfactants or at lower surfactant concentrations in the presence of an electrolyte. Although lamellar and spherulitic phases are similar in that they both comprise bilayers of surfactant separated by an aqueous layer, it is the spherulitic phase that forms packed vesicles or spherulites which provide a structured surfactant system having a "yield value" that provides suspending properties. Spherulites comprise surfactant bilayers arranged in concentric shells, and can have a diameter in the range of 1000 to 15000 angstroms. In the spherulitic phase, spherulites are dispersed in the manner of a classical emulsion and provide a close-packed, three-dimensional network that can suspend particles.

Although structured surfactant systems have been suggested for use in agricultural formulations, there is still a need for improved structured surfactant systems and formulations that can provide the rheology, stability, suspensibility, and efficacy properties needed to meet marketplace demand. The agricultural formulations should remain stable and not phase separate when subjected to changes in temperature. The formulations should also have a viscosity that is both low enough so that the formulation is pourable, and does not significantly decrease at higher temperatures, nor significantly increase at lower temperatures. When diluted for use, the agricultural formulations should exhibit as little sedimentation as possible to result in an even application of the pesticide in the field. One drawback of some prior art structured surfactant systems is that sedimentation can occur after dilution, showing that such systems have inadequate suspensibility properties.

Agricultural formulations are also becoming increasingly more complex to meet market demand, comprising, for example, two or more active ingredients that may be incompatible with each other. Preparing more complex formulations that have acceptable efficacy and rheological, stability, and suspensibility properties can be challenging. There is therefore a need in the art for structured surfactant formulations that can provide improved properties, including stability, suspensibility, and rheological properties, so that complex formulations, such as those comprising two or more active ingredients, can remain stable over time, yet are easily diluted in water without sedimenting.

SUMMARY OF THE INVENTION

In one aspect, this disclosure provides an agricultural composition comprising (a) an aqueous structured surfactant system comprising water, and a mixture of surfactants, wherein the mixture of surfactants comprises at least one high HLB surfactant having an HLB value of greater than 10, and at least one low HLB surfactant having an HLB value of 10 or less, wherein the high HLB surfactant and the low HLB surfactant are present in an amount and at a weight ratio effective to form the structured surfactant system; and (b) at least one water insoluble or sparingly soluble pesticide stably suspended within the structured surfactant system. In some embodiments, the low HLB surfactant comprises an alcohol ethoxylate having a carbon chain length ranging from C9-C13, alternatively C9-C11, and 2-3 moles of ethylene oxide, the high HLB surfactant comprises tristyrylphenol ethoxylate, and the weight ratio of low HLB surfactant to high HLB surfactant is about 1:1.

In a further aspect, this disclosure provides an agricultural composition that comprises a structured electrolyte system, wherein the structured electrolyte system comprises (a) water; (b) from about 5% to about 30% by weight of an electrolyte selected from the group consisting of fertilizers, micronutrients, water soluble pesticide salts, and combinations thereof; and a mixture of surfactants comprising at least one high HLB surfactant having an HLB value of greater than 10, and at least one low HLB surfactant having an HLB value of 10 or less, wherein the high HLB surfactant and the low HLB surfactant are present in an amount and at a weight ratio effective to form the structured electrolyte system. In some embodiments, the composition comprises one or more water soluble pesticide salts as the electrolyte in an amount of about 21% to about 27% by weight, the low HLB surfactant comprises an alcohol ethoxylate having a carbon chain length of C9-C11 and 2-3 moles of ethylene oxide, the high HLB surfactant comprises an amine oxide having a carbon chain length ranging from 8-22 carbon atoms, and the weight ratio of low HLB surfactant to high HLB surfactant is about 1.4:1 to about 1.6:1. In other embodiments, the composition comprises a fertilizer as the electrolyte, the low HLB surfactant comprises an alcohol ethoxylate having a carbon chain length of C9-C11 and 2-3 moles of ethylene oxide, the high HLB surfactant comprises an amine oxide having a carbon chain length ranging from 8-22 carbon atoms, and the weight ratio of low HLB surfactant to high HLB surfactant is about 2.2:1 to about 4:1.

DETAILED DESCRIPTION

The present technology relates to improved agricultural formulations that employ structured surfactant systems to suspend water-insoluble or sparingly soluble agricultural actives, with or without water-insoluble or sparingly soluble adjuvants. The present technology also relates to agricultural formulations that employ structured electrolyte systems that suspend water-insoluble or sparingly soluble agricultural actives and/or adjuvants. The structured systems of the present technology enable formulation of more complex compositions that comprise combinations of agricultural actives, and have improved stability, suspensibility, and rheological properties compared to prior art compositions.

The term "agricultural actives" as used herein includes chemicals or other substances that kill, repel, or inhibit the growth or reproduction of unwanted organisms or plants, or which protect or promote the healthy growth of wanted organisms or plants. Agricultural actives include "pesticides", which encompass insecticides, fungicides, and herbicides; crop oils and vegetable oils; and fertilizers or other plant nutrients or hormones.

The term "adjuvant" as used herein means a substance included in or combined with an agricultural composition to increase the efficacy of a pesticide in the agricultural composition, Desirable attributes for an agricultural composition include stability of the composition at room temperature, as well as stability at elevated temperatures and through multiple freeze/thaw cycles. Agricultural compositions having acceptable temperature stability show no or very little phase separation of the concentrate, no increase in viscosity, no significant growth in particle size of the active, and no hard-packing of the active particles. Hard-packing is a change in density that indicates a lack of homogeneity of the active ingredient throughout the formulation. As demonstrated in the examples described below, agricultural compositions of the present technology have very good stability at an elevated temperature of 54° C. and over multiple freeze/thaw cycles.

As known in the art, agricultural compositions are often provided as concentrates that are diluted prior to use. Stability is important not only for the concentrate, but also for the diluted composition. When the agricultural concentrate is diluted prior use, the resulting diluted product needs to show as little sedimentation as possible to result in an even application of the active in the field. The tendency to sediment can be assessed by the suspensibility test, ASTM E1673-96, which is a quantitative method for determining the sedimentation of the diluted product over 30 minutes. Briefly, the test is performed by combining a known weight of a sample of the agricultural composition with 250 mL of hard water (such as 1000 ppm hardness) in a cylinder, inverting the cylinder 15 times, then allowing the cylinder to rest for 30 minutes. After 30 minutes, the top 225 mL of liquid in the cylinder is vacuumed off, the bottom 25 mL of liquid is removed and dried, and the dried sample is weighed. The dried sample is compared to the weight of the solids in the starting sample to determine how much of the solids dropped out of suspension into the bottom 25 mL of the test solution. The result is expressed in terms of percent suspensibility. A suspensibility of 100% indicates that no particles have sedimented over 30 minutes. A suspensibility of less than 90% shows the diluted composition lacks sufficient stability to keep the active particles evenly dispersed. Suspensibility should therefore be at least 90%, alternatively at least 95%, alternatively at least 98%. In some preferred embodiments, agricultural compositions of the present technology have a suspensibility of at least 99%, both before and after undergoing temperature stability testing.

The agricultural compositions of the present technology have improved properties through the selection of particular surfactants that will both self-assemble into structured systems that provide the required suspension of particulate actives in the concentrate, and provide the suspensibility properties required for the stability of the diluted product. The structured surfactant systems of the present technology comprise a mixture of particular surfactants, at least one of which has a hydrophilic-lipophilic balance (HLB) value that is less than 10, referred to herein as the "low HLB surfactant", and at least one of which has a hydrophilic-lipophilic balance that is 10 or greater, referred to herein as the "high HLB surfactant". Surfactants having a low HLB are lipophilic and have low solubility in water. Surfactants having a high HLB are hydrophilic and have a high solubility in water. The combination of particular selected low HLB surfactants and high HLB surfactants can force conformation of the surfactants into the vesicle phase, forming the structured surfactant system.

The low HLB surfactant has an HLB value of less than 10, alternatively about 9 or less, alternatively about 8 or less, alternatively about 8 to about 9. Low HLB surfactants that can be used to form the structured surfactant system include calcium dodecylbenzene sulfonate, and fatty alcohol ethoxylates having a carbon chain length of 8-22 carbon atoms and an amount of ethoxylation in the range of about 1-4 moles, alternatively 2-3 moles. Commercially available fatty alcohol ethoxylates that are suitable for use herein include Bio-Soft® N91-2.5, a C9-11 alcohol ethoxylate having 2.5 moles of ethylene oxide (HLB 8.5), Bio-Soft® N23-3, a C12-13 alcohol ethoxylate having 3 moles of ethylene oxide (HLB 8.1), and Makon® TD-3, a tridecyl alcohol ethoxylate with 3 moles of ethylene oxide (HLB 8), all available from Stepan Company, Northfield, Ill. Other hydrophobic materials that are not normally considered surfactants may also be used as the low HLB surfactant. Such materials include fatty acids, linear fatty alcohols having a carbon chain length of 8-22 carbon atoms, and dimethyl amides having an alkyl chain length of about 8-12 carbon atoms, such as N,N-dimethyldecanamide and N,N-dimethyloctanamide. Mixtures of the low HLB surfactants can also be used.

The high HLB surfactant has an HLB value of 10 to about 30, alternatively 10 to about 20, and can be an anionic, cationic, nonionic, or amphoteric surfactant, or mixtures thereof. Examples of anionic surfactants include alkyl phosphates, alkyl alkoxy phosphates, aryl alkoxy phosphates, alkyl sulfates, alkyl alkoxy sulfates, alkyl ether sulfates, sulfosuccinates, salts of dodecylbenzene sulfonate, and combinations thereof. Examples of cationic surfactants include alkyl dimethyl ammonium halogenide, esterquat, amidoquat, and stearamidopropyl dimethyl amine quat. Examples of nonionic surfactants include aryl alkoxylates, ethoxylated fatty acid alkanolamides, and ethoxylated fatty amines, alkyl phosphate esters, alkyl alkoxylate phosphate esters, arylalkoxylate phosphate esters, EO/PO alkoxylates, fatty alcohol ethoxylates, fatty acid ethoxylates, ethoxylated triglycerides, sorbitan esters, sorbitan ester ethoxylates, or combinations thereof. Examples of amphoteric surfactants include alkyl amine oxides preferably having a carbon chain length in the range of about 10-18 carbons, alkylbetaines, and alkylamidopropylbetaines. Mixtures of high HLB surfactants may also be employed.

Preferred high HLB surfactants for use herein include amine oxides, sodium lauryl ether sulfate, tristyrylphenol ethoxylates, tristyrylphenol phosphate esters.

The low and high HLB surfactants are mixed together in relative proportions in order to form the structured surfactant system. In general, the weight ratio of the low HLB surfactant to high HLB surfactant in the surfactant system can range from about 4:1 to about 1:4, depending upon the particular surfactants selected. The total amount of structuring surfactants in the agricultural compositions should be at least 5% by weight based on the weight of the composition. Useful surfactant concentrations range from about 5% to about 40% by weight, alternatively about 5% to about 35%, alternatively about 7% to about 30%, alternatively about 8% to about 25% by weight of the agricultural composition and include any percentage or range there between.

Figure 1:
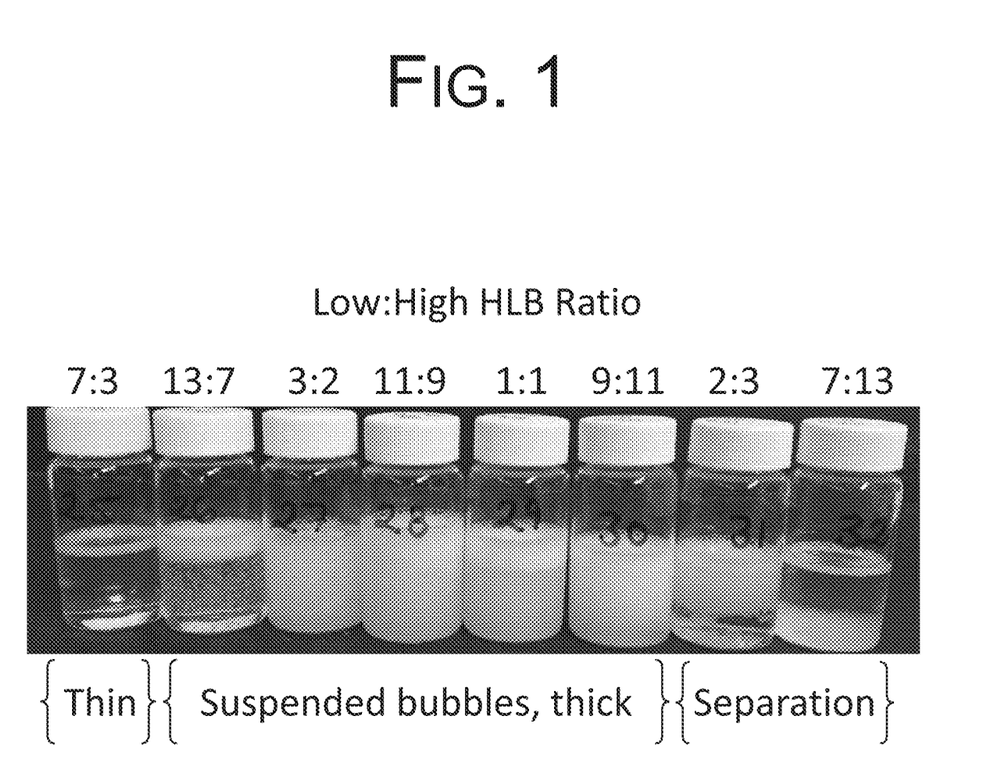
FIG. 1 shows photographs of surfactant systems employing different ratios of low HLB surfactant and high HLB surfactant.

It should be appreciated by one skilled in the art that not every combination of low HLB surfactant and high HLB surfactant will form a structured surfactant system, and not every ratio of low HLB surfactant and high HLB surfactant within the 1:4 to 4:1 range will form a structured surfactant system. However, a particular combination of low HLB surfactant and high HLB surfactant in a particular ratio that will achieve a structured surfactant system can be determined through a screening process. For example, a low HLB surfactant suitable for agricultural applications, such as a low HLB surfactant identified above, can be selected as the low HLB surfactant, and a high HLB surfactant suitable for agricultural applications, such as a high HLB surfactant identified above, can be selected as the high HLB surfactant. The selected surfactants can then be combined in varying ratios of low HLB to high HLB surfactant in water to form an aqueous surfactant solution. After combining, the mixtures containing the different ratios of low HLB and high HLB surfactants can be visually compared. The ratios of the surfactants forming the structured surfactant system can be identified by observing suspended air bubbles throughout the aqueous system, increased viscosity, and stability as a homogenous solution. The results of one determination of ratios of low HLB and high HLB surfactants forming a structured surfactant system are shown in FIG. 1.

Particular combinations of surfactants found to be useful in the present technology include, but are not limited to, C9-11 alcohol ethoxylate containing 2.5 moles of ethoxylate as the low HLB surfactant, and lauramine oxide, decylamine oxide, tristyrylphenol ethoxylate (16EO) phosphate ester, or a combination thereof, as the high HLB surfactant; C12-13 alcohol ethoxylate containing 3 moles of ethoxylate as the low HLB surfactant, and tristyrylphenol ethoxylate (60EO) as the high HLB surfactant; and dimethyloctanamide as the low HLB surfactant and alkyl ether sulfate with 2 moles of ethylene oxide as the high HLB surfactant.

The structured surfactant systems of the present technology have a high yield value enabling the stable suspension of a variety of different agricultural actives and/or oil adjuvants at rest. By "high yield value" is meant that the structured surfactant system has the ability to support particulate (gas, solid, liquid) matter. A high yield value enables the structured surfactant system to suspend solid, liquid, or gas particles throughout the agricultural composition. The structured surfactant systems are also shear-thinning, non-thixotropic, and have high elasticity. "Shear-thinning" means the viscosity of the structured surfactant system will decrease as the shear rate increases. "Non-thixotropic" means the structured surfactant system rapidly recovers its viscosity once shear has stopped, and there is not a quantifiable amount of time required for recovery as in thixotropic systems.

Suspended Actives

The structured surfactant systems of the present technology enable a wide variety of water insoluble or sparingly soluble agricultural actives to be suspended in the systems. Agricultural actives that can be stably suspended include one or more pesticides, such as but not limited to, selective or broad spectrum herbicides, insecticides, and fungicides. Some examples of suitable pesticides include, but are not limited to, Atrazine, Iprodione, Carbaryl, Carbendazim, Nicosulfuron, Diuron, and Tebuconazole. The amount of pesticide active that can be suspended can range from about 10% to about 80%, alternatively about 10% to about 70%, alternatively about 10% to about 50%, alternatively about 15% to about 50% by weight of the agricultural composition, although it is often desirable to suspend as much pesticide active as possible. In some embodiments, a useful structured surfactant system for suspending the agricultural active comprises an alcohol ethoxylate having a carbon chain length ranging from 9 to 13 carbon atoms, alternatively 9-11 carbon atoms, and 2-3 moles of ethylene oxide, combined with tristyrylphenol ethoxylate in a weight ratio of about 1:1.

Adjuvants

One or more adjuvants can be added to the formulation to increase the efficacy of pesticides in agricultural applications, either in the concentrated product ('built-in') or in the diluted product ('tank-mix'). Some adjuvants have a very low solubility in water and can cause compatibility issues, either when built into the aqueous pesticide concentrate or when tank mixed with the diluted pesticide product. The structured surfactant technology allows to build in the adjuvant in the aqueous pesticide formulations and to be compatible in dilution. Examples of adjuvants with low solubility in water include, but are not limited to, crop oils, vegetable oil concentrates, methylated seed oils, and modified triglycerides. Examples of crop oils and vegetable oils that can be suspended in the structured surfactant system include, but are not limited to, rapeseed oil, sunflower oil, corn oil, olive oil, palm oil, castor oil, mineral oil, and paraffinic oil. Examples of methylated seed oils that can be suspended in the structured surfactant system include, but are not limited to, coconut oil methyl esters, palm oil methyl esters, rapeseed oil methyl esters, canola oil methyl esters, and soybean oil methyl esters. Examples of other non-aqueous adjuvants that can be suspended in the structured surfactant system include, but are not limited to, fatty alcohols, acids or amines, ethoxylated or not. The amount of adjuvant that can be suspended can range from about 5% to about 30%, alternatively about 10% to about 20% by weight of the agricultural composition.

In some embodiments, a structured surfactant system can be prepared with an alcohol ethoxylate, such as C12-13 alcohol ethoxylate containing 3 moles of ethylene oxide, as the low HLB surfactant, and tristyrylphenol ethoxylate as the high HLB surfactant in a ratio of about 1.8:1 to about 2.2:1, to suspend both a pesticide active and a vegetable oil concentrate. The resulting formulation effectively combines a suspension concentrate formulation with a vegetable oil concentrate to form a stable combination formulation.

Electrolyte

In some embodiments, the structured surfactant systems are prepared using the low HLB surfactant and high HLB surfactant in combination with an electrolyte. When using an electrolyte, it is important to determine the ratio of low HLB and high HLB surfactants with the electrolyte present at the desired amount for the formulation in order to optimize the surfactant ratio. Preferred electrolytes for use herein are those that can provide additional functions in a pesticide formulation. Examples of useful electrolytes include water soluble pesticide salts, such as but not limited to, potassium Glyphosate, isopropyl amine Glyphosate (IPA Glyphosate), potassium and isopropyl amine Glyphosate (KIPA Glyphosate), fertilizers comprising one or more of nitrogen, potassium, or phosphate, such as, for example, urea and ammonium nitrate fertilizer, micronutrients, or combinations of any of the foregoing. The amount of electrolyte can range from about 5% to about 50%, alternatively about 5% to about 30% by weight of the agricultural composition, although when the electrolyte provides an additional function in the composition, the amount of the electrolyte is preferably about 10% to about 28% by weight of the composition, alternatively about 12% to about 25% by weight of the composition. In some embodiments, a useful amount of potassium Glyphosate or KIPA Glyphosate can range from about 18% to about 28% by weight of the agricultural composition. In such compositions, the surfactant system can comprise, in some embodiments, an alcohol ethoxylate having a carbon chain length of C9-C11 and 2-3 moles of ethylene oxide and an amine oxide having a carbon chain length ranging from 8-22 carbon atoms, in a weight ratio of about 1.4:1 to about 1.6:1. In other embodiments, agricultural composition concentrates can comprise urea and ammonium nitrate fertilizer as the electrolyte in an amount ranging from about 10% to about 30% by weight of the agricultural composition. Useful surfactant systems for such compositions can comprise, in some embodiments, an alcohol ethoxylate having a carbon chain length of C9-C11 and 2-3 moles of ethylene oxide and an amine oxide having a carbon chain length ranging from 8-22 carbon atoms, in a weight ratio of about 2.2:1 to about 4:1.

Agricultural concentrates with suspended actives by the structured surfactant technology can also be diluted into fertilizer solution. The fertilizer solution could be a concentrate, in which case the agricultural concentrate and fertilizer concentrate can be combined, and the combined formulation can then be diluted to an appropriate dilution. Alternatively, the fertilizer solution could already be a diluted solution, in which case the agricultural concentrate can be mixed with the fertilizer solution to dilute the agricultural concentrate to an appropriate dilution, depending on the needs of the field.

The structured electrolyte and surfactant system can also be used to suspend a variety of different pesticides and/or oils. For example, linear alcohol ethoxylate having a carbon chain in the range of C9-C11 and 2-3 moles of ethylene oxide as the low HLB surfactant, and amine oxide, either alone or in combination with tristyrylphenol phosphate ester as the high HLB surfactant, in a ratio of about 0.5:1 to about 1.7:1 can be structured in the presence of KIPA Glyphosate, and this structured system can be used to suspend a pesticide active. The resulting formulation effectively combines a suspension concentrate formulation with a soluble liquid formulation to form a stable combination formulation. In other embodiments, alcohol ethoxylate having a carbon chain in the range of C9-C11 and 2-3 moles of ethylene oxide as the low HLB surfactant, and amine oxide as the high HLB surfactant, in a ratio of about 1.8:1 to about 2.4:1, can be structured in the presence of fertilizer, and this structured system can be used to suspend a pesticide active. In further embodiments, the structured electrolyte and surfactant system can suspend crop oils or vegetable oils, such as rapeseed oil. Useful surfactants for suspending vegetable oil in a structured glyphosate system include alcohol ethoxylate having a carbon chain in the range of C9-C11 and 2-3 moles of ethylene oxide as the low HLB surfactant, and amine oxide as the high HLB surfactant, in a ratio of about 1.4:1 to about 1.6:1, preferably about 1.5:1. The resulting formulation effectively combines a crop oil concentrate or vegetable oil concentrate and a soluble liquid formulation into a single stable combination formulation.

In other embodiments, a combination formulation can be prepared by dissolving an oil soluble pesticide in the low HLB surfactant, forming a structured surfactant system by the addition of a suitable high HLB surfactant, and suspending solid particles of a second pesticide in the structured surfactant system. For example, in one embodiment, Tebuconazole, an oil soluble pesticide, is dissolved in a C10 dimethylamide as the low HLB surfactant, which is then structured with sodium lauryl ether sulfate as the high HLB surfactant. A second pesticide, Carbendazim is then suspended in the structured surfactant system.

Other Components

The agricultural compositions of the present technology may include additional components, such as, for example antifoaming agents, such as silicone oils, dispersants and wetting agents, such as phosphate esters and EO/PO block copolymers, solvents, emulsifiers, buffers, and preservatives. Typical amounts of the antifoaming agent range from about 0.1% to about 5% by weight of the composition, and amounts of the dispersants and/or wetting agents can range from about 0.5% to about 10% by weight of the composition.

The agricultural compositions of the present technology, comprising the structured surfactant systems, provide a number of advantages. The structured surfactant systems can provide improved stability to suspension concentrate formulations comprising high electrolyte and/or agricultural active concentrations. At low pH values, formulations containing structured surfactants show superior temperature stability compared to other rheology aids like xanthan gum. Indeed, polysaccharides like Xanthan Gum can hydrolyze at acidic pH, leading to their ineffectiveness as rheology aids. Temperature stability at lower pH values allows the structured surfactant systems to be used with agricultural actives that require acidic systems. A further advantage of compositions of the present technology is that, in some embodiments, the suspension concentrates can be diluted into fertilizer compositions instead of water, providing a combination of agricultural actives for single application.

The presently described technology and its advantages will be better understood by reference to the following examples. By providing these examples, the inventors do not limit the scope and spirit of the present technology.

In the following examples, suspensibility is determined using the following method derived from ASTM E1673-96:

A known weight of suspension concentrate is combined with 250 mL of water at a given water hardness in a 250 mL cylinder. The cylinder is stoppered and inverted 15 times, and then left undisturbed for 30 minutes. After 30 minutes, the top 225 mL of liquid in the cylinder is vacuumed off leaving the bottom 25 mL of liquid undisturbed.

The remaining liquid is then poured into a weighed beaker. The cylinder is rinsed a few times with deionized water, with all the rinsing liquid being added to the beaker. The beaker containing the liquid is then put into an oven uncovered to be dried for 24-48 hours until all liquid has evaporated. The dried residue is cooled and its weight is determined. The amount of residue is subtracted from the amount of solids added to the cylinder, multiplied by 10/9 (10/9 is equal to the 250 mL total/225 mL vacuumed), divided by the amount of solids added to the cylinder, and multiplied by 100 to obtain percent suspensibility. The suspensibility calculation indicates the amount of solids that remained suspended in the 225 mL of liquid removed from the cylinder, and the remaining 25 mL at the bottom of the cylinder contains the solids that fell out of suspension.

TABLE 1

Composition Trade Names and Abbreviations

| | |
|---|---|
| AMMONYX ® LO[1] | Lauramine Oxide |
| BIO-SOFT ® N23-3[1] | Linear alcohol C12-C13) ethoxylate with 3 moles ethylene oxide |
| BIO-SOFT ® N91-2.5[1] | Linear alcohol (C9-C11) ethoxylate with 2.5 moles ethylene oxide |
| HALLCOMID ™ M-10[1] | Dimethyl octanamide |
| MAKON ® TSP-60[1] | Tristyrylphenol ethoxylate with 60 moles ethylene oxide |
| STEOL ® CS-270C[1] | alkyl ether sulfate (sodium laureth sulfate) with 2 moles ethylene oxide |
| STEPFAC ™ TSP-PE[1] | Tristyrylphenol ethoxylate phosphate ester |
| STEP-FLOW ® 26F[1] | Ethylene oxide and propylene oxide block copolymer |
| SAG 1572[2] | Silicone emulsion defoamer |
| TOXIMUL ® 8320[1] | EO/PO block copolymer |
| UAN 30-0-0[1] | Urea and Nitrogen fertilizer |
| STEPOSOL ® SB-W[1] | Soybean oil methylester |
| Kelzan ® S (series A)[3] | xanthan gum |
| Kelzan ® ASX (series B)[3] | xanthan gum |

[1]Available from Stepan Company, Northfield, IL
[2]Available from Momentive, Waterford, NY
[3]Available from CP Kelco, Atlanta, GA Example 1: Comparison of Structured Surfactant System to Xanthan Gum as a Rheology Modifier A structured surfactant pesticide formulation was prepared using the components and amounts shown in Table 2.

TABLE 2

| Component | wt % |
|---|---|
| Atrazine | 44.8 |
| Toximul ® 8320 | 3.0 |
| SAG 1572 | 0.2 |
| Propylene Glycol | 5.0 |
| Water | 38.4 |
| Stepfac ™ TSP-PE | 4.3 |
| Bio-Soft ® N91-2.5 | 4.3 |

Figure 2:
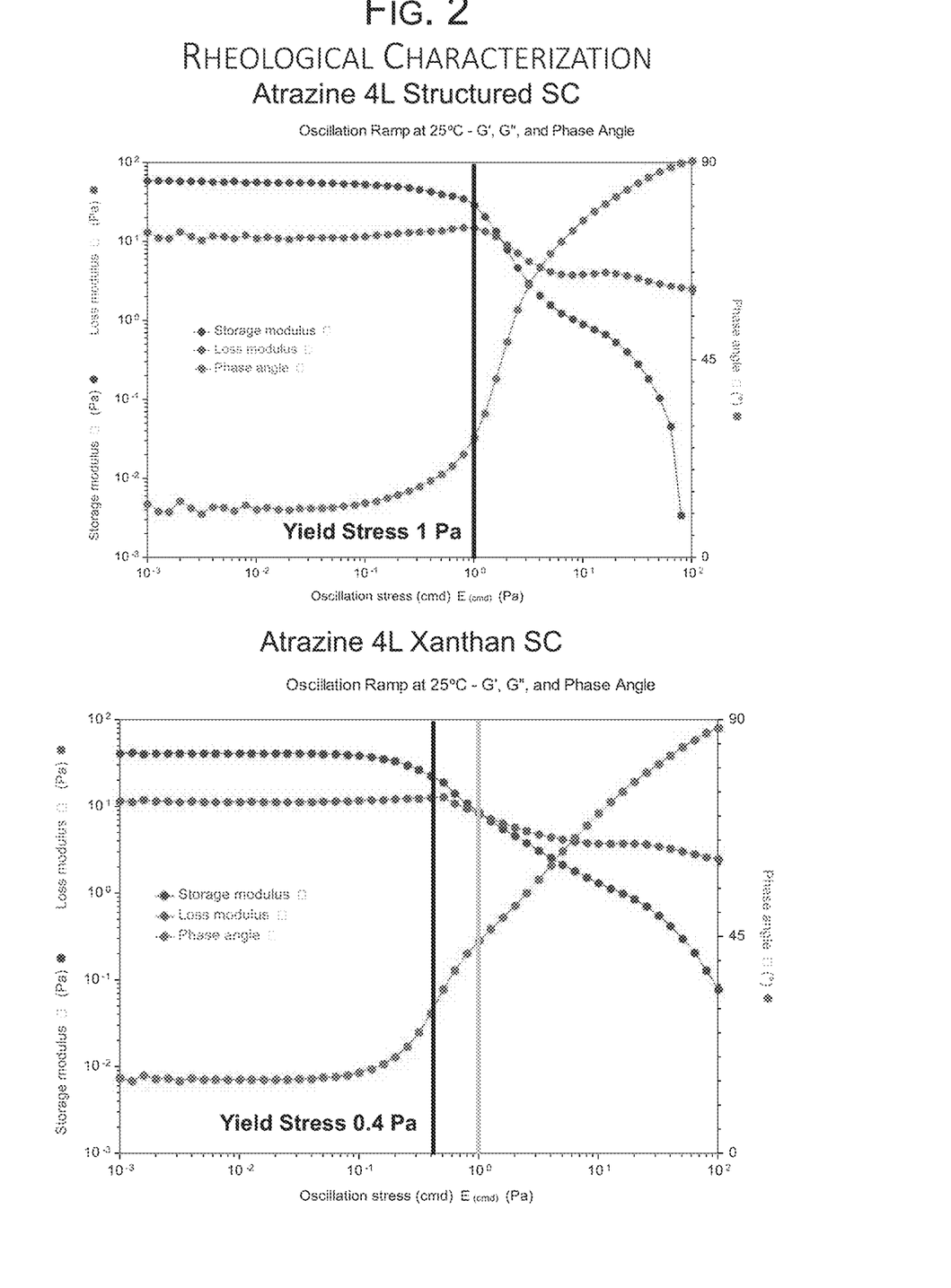
FIG. 2 shows the oscillation stress sweep results for a formulation comprising a structured surfactant system and a formulation comprising xanthan gum.
Figure 3:
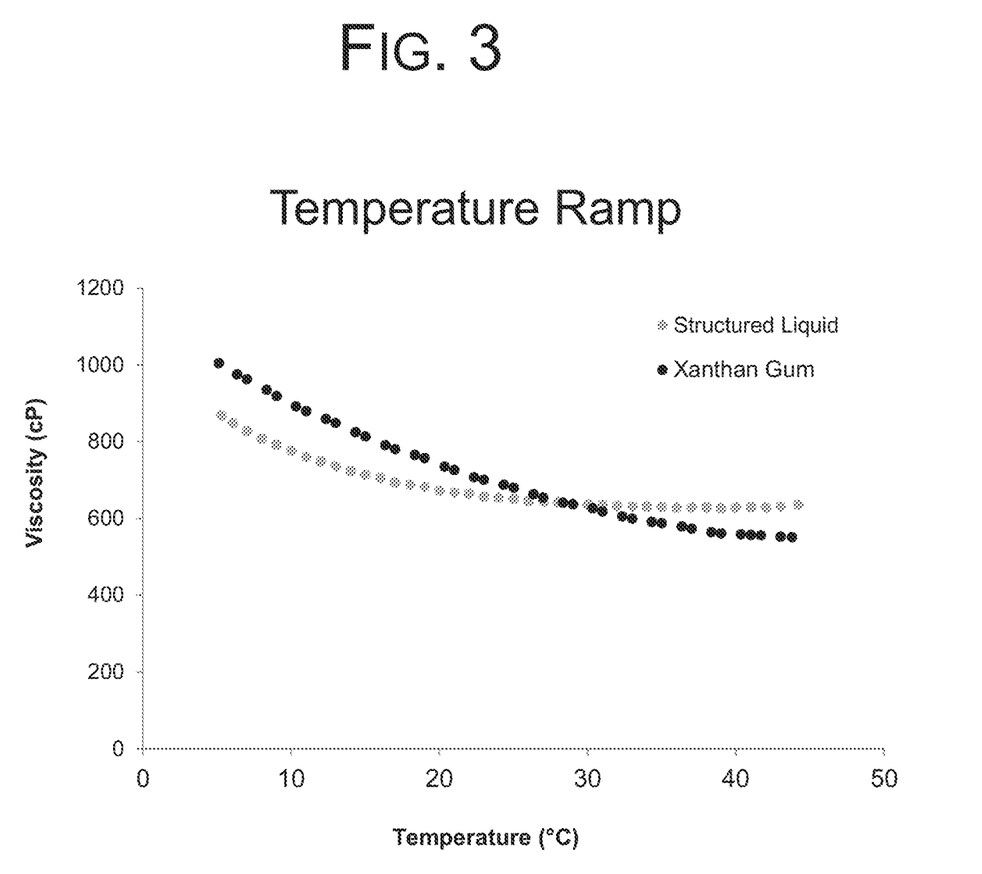
FIG. 3 shows the temperature ramp results for a formulation comprising a structured surfactant system and a formulation comprising xanthan gum.
Figure 4:
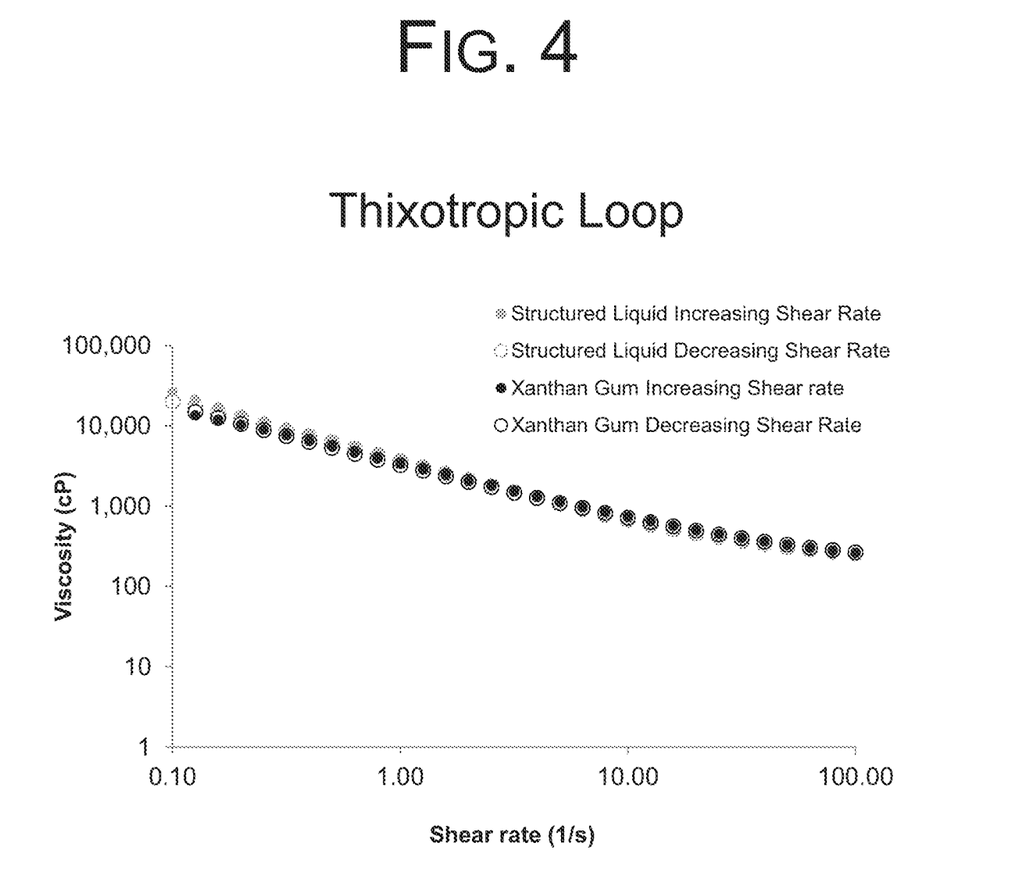
FIG. 4 shows the results of a thixotropic loop evaluation for a formulation comprising a structured surfactant system and a formulation comprising xanthan gum.

The formulation was prepared by combining STEPFAC™ TSP-PE as the high HLB surfactant with the other components except BIO-SOFT® N91-2.5, and milling until a particle size between 3-7 microns for about 50% of the particles was obtained. After milling, the BIO-SOFT® N91-2.5 was then added as the low HLB component to form a structured surfactant composition suspending the Atrazine pesticide. The formulation was evaluated for rheological properties against a control formulation containing xanthan gum as the rheology modifier. An oscillation stress sweep, a thixotropic loop and a temperature ramp were performed on each formulation using a Discovery HR-3 hybrid rheometer from TA Instruments. The results of the oscillation stress sweep are provided in FIG. 2 and show that the structured surfactant formulation has a lower phase angle than that of the xanthan gum control. A lower phase angle indicates the structured surfactant system has a higher storage modulus relative to the loss modulus. In addition, the structured surfactant formulation shows a higher yield stress than the Xanthan gum control. The results of the temperature ramp are shown in FIG. 3 and demonstrate that viscosity of the structured surfactant formulation is less dependent on temperature than the xanthan gum control. The results further show that the structured surfactant formulation provides similar viscosities over a range of temperatures. A formulation having a viscosity profile that is flat, i.e. one that does not vary significantly with changes in temperature, is advantageous because exposure to higher temperatures does not lead to a drop in viscosity that could result in sedimentation, and exposure to lower temperatures does not lead to an increased viscosity that could affect pourability. The results of the thixotropic loop evaluation are shown in FIG. 4 and demonstrate that the structured surfactant formulation is shear-thinning and non-thixotropic. Shear-thinning is desirable for ease of formulation handling. A non-thixotropic formulation is advantageous because it may have less sedimentation than a thixotropic formulation. With a thixotropic formulation, the longer amount of time required for viscosity recovery could lead to sedimentation during the recovery time.

Example 2: Structured Electrolyte Formulations

Structured surfactant formulations were prepared that comprised structured surfactant blends in combination with a high concentration of an electrolyte active. The electrolyte actives used were potassium and isopropyl amine Glyphosate (KIPA Glyphosate), potassium Glyphosate (K Glyphosate) and urea and ammonium nitrate (UAN) fertilizer. Example formulations are shown in Table 3.

TABLE 3

| Component | Formulation 1 | Formulation 2 | Formulation 3 |
|---|---|---|---|
| KIPA-Glyphosate (47%) | 50.0 wt % | — | — |
| K-Glyphosate (44%) | — | 50.0 wt % | — |
| UAN 30-0-0 | — | — | 50 wt % |
| Water | 21.0 wt % | 21.0 wt % | 24.5 wt % |
| AMMONYX ® LO | 20.0 wt % | 20.0 wt % | 15.0 wt % |
| BIO-SOFT ® N91-2.5 | 9.0 wt % | 9.0 wt % | 10.5 wt % |

The formulations were prepared by mixing the electrolyte with water. AMMONYX® LO (high HLB surfactant) was then added and mixed with the electrolyte solution. BIO-SOFT® N91-2.5 (low HLB surfactant) was then added and mixed. Each of the formulations formed a structured system that remained stable in a 54° C. oven for two weeks and for five cycles of freeze/thaw in a freezer about −15° C.

Example 3: Structured Electrolyte System with Suspended Active

A formulation was prepared in which the structured electrolyte system was used to suspend a water-insoluble pesticide active, Atrazine. The formulation is shown in Table 4.

TABLE 4

| Component | wt % |
|---|---|
| Atrazine | 15% |
| STEP-FLOW ® 26F | 3.0% |
| STEPFAC ™ TSP-PE | 1.0% |
| SAG 1572 | 0.2% |
| Water | 24.8% |
| KIPA-Glyphosate (47%) | 47.5% |
| AMMONYX ® LO | 5.65% |
| BIO-SOFT ® N91-2.5 | 2.85% |

The formulation was prepared by combining the amine oxide, ethylene oxide and propylene oxide block copolymer, tristyrylphenol ethoxylate phosphate ester (which also functions as an additional high HLB surfactant), silicone emulsion defoamer, and water in an Attritor mill cup. Atrazine was added to the mill cup, incorporated, and milled in the Attritor mill until a particle size between 3-7 microns for 50% of the particles was obtained. The material was recovered from the mill and milling media, and the alcohol ethoxylate was added and mixed. The formulation formed a structured system which suspended the Atrazine particles. The formulation was evaluated for suspensibility according to ASTM E1673-96, and also evaluated for elevated temperature and freeze/thaw stability. Suspensibility was determined on the initial formulation as well as the formulation after completion of the temperature stability testing. The formulation remained stable in a 54° C. oven for two weeks and for five cycles of freeze/thaw in a freezer at about −15° C., indicating the formulation had good temperature stability. The results of the suspensibility testing are shown in Table 5.

TABLE 5

| Temperature Condition | Water Hardness, ppm | Suspensibility, % |
|---|---|---|
| Initial Sample, Ambient | 342 | 99.86 |
| Initial Sample, Ambient | 1000 | 99.52 |
| After 2 weeks in 54° oven | 342 | 99.29 |
| After 2 weeks in 54° oven | 1000 | 99.12 |
| After 5 cycles freeze/thaw In −15° freezer | 342 | 99.66 |
| After 5 cycles freeze/thaw In −15° freezer | 1000 | 99.49 |

The results in Table 5 show that the Table 4 formulation had suspensibility of greater than 99% both prior to and after the temperature stability testing. These results demonstrate that the formulation has excellent suspensibility over a wide range of temperatures.

Figure 5:
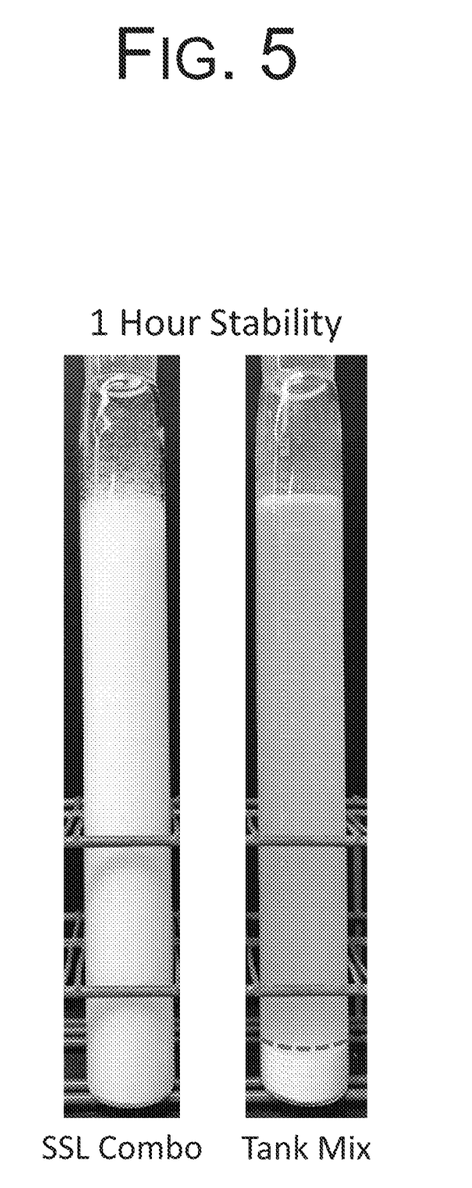
FIG. 5 shows photographs of the one hour stability testing of a KIPA Glyphosate with suspended Atrazine particles compared to a tank mixture of KIPA Glyphosate and Atrazine SC with Xanthan gum as a rheology aid.

The structured electrolyte formulation was diluted in water to a 5% dilution, and stability was compared to that of a tank mix of generic KIPA Glyphosate and generic Atrazine suspension concentrate (SC), comprising xanthan gum as a rheological modifier, at the same active ingredient levels. Stability of each formulation was evaluated by inverting columns containing each formulation fifteen times and then observing the amount of separation in the formulation at time intervals of fifteen minutes, thirty minutes, and one hour. The tank mixed material comprising xanthan gum sedimented within fifteen minutes after inversions, whereas the structured surfactant formulation had no separation. After one hour, the tank mix material had 7.5% separation while the structured surfactant formulation had only trace levels of cream separation. Photographs showing the results of the stability testing at one hour are shown in FIG. 5.

Example 4: Structured Electrolyte System with Suspended Oil

Formulations were prepared in which a structured electrolyte system was used to suspend an oil adjuvant at different oil concentrations. The formulations are shown in Table 6.

TABLE 6

| Component | Formulation 1 wt % | Formulation 2 wt % |
|---|---|---|
| KIPA-Glyphosate (47%) | 45.0 | 40.0 |
| Water | 18.9 | 16.8 |
| AMMONYX ® LO | 18.0 | 16.0 |
| BIO-SOFT ® N91-2.5 | 8.1 | 7.2 |
| Rapeseed oil | 10.0 | 20.0 |

The formulations were prepared by mixing KIPA Glyphosate (47%) with the water, and adding and mixing the lauramine oxide, Ammonyx® LO. The linear alcohol ethoxylate component, Bio-Soft® N91-2.5, was then added and mixed to form a structured KIPA Glyphosate system. The rapeseed oil was then added and mixed into the structured system to create a formulation in which the rapeseed oil was suspended in the structured KIPA Glyphosate system. The formulations were evaluated for temperature and freeze/thaw stability, and remained stable in a 54° C. oven for two weeks and for five cycles of freeze/thaw in a freezer at about −15° C.

Figure 6:
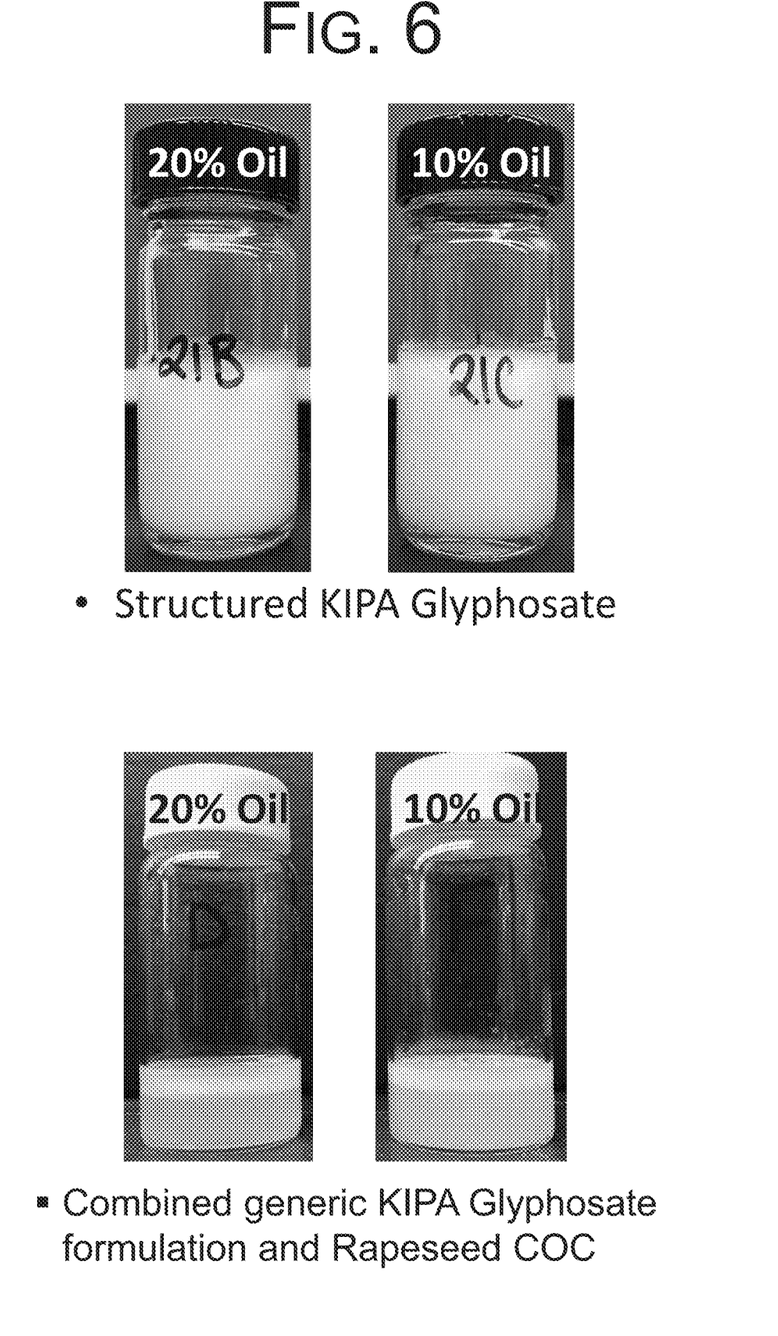
FIG. 6 shows photographs of stability testing results of a structured KIPA Glyphosate formulation with suspended oil compared to a tank mixture of KIPA Glyphosate and oil.

The structured KIPA Glyphosate formulations were diluted in water to a 5% dilution, and stability of the formulations was compared to that of a tank mix control of generic KIPA Glyphosate mixed with a generic rapeseed oil crop oil concentrate at the same active ingredient levels. Stability of the formulations was evaluated. As shown in FIG. 6, the formulations prepared by mixing a KIPA Glyphosate concentrate and a rapeseed oil concentrate separated after mixing, while the formulations in which rapeseed oil was suspended in the structured KIPA Glyphosate formulations had no separation.

Example 5: Suspensibility Testing

Pesticide formulations were prepared using the components and amounts shown in Table 7. Comparative Examples 1 and 2 are taken from U.S. Pat. No. 9,668,474, Table N, using 2.5% by weight of the amine oxide as is for Comparative Example 1, and using 8.4% by weight amine oxide to provide 2.5% by weight amine oxide active for Comparative Example 2. Comparative Examples 3 and 4 are taken from EP0388239, Example 5, prepared by mixing the coconut dimethanolamine and lauryl ethoxy sulfate together first, followed by adding the linear alkyl diethanolamine for Comparative Example 3, and mixing the linear alkyl diethanolamine and lauryl ethoxy sulfate together first, followed by adding the coconut dimethanolamine for Comparative Example 4. Comparative Example 5 is taken from U.S. Pat. No. 5,547,918, Example 1.

The formulations shown in Table 7 were evaluated for suspensibility following the methodology in ASTM E1673-96.

The results of the suspensibility testing in 1000 ppm hard water after 54° C. oven stability are shown in Table 8.

TABLE 8

Suspensibility Test Results

| Formulation | Suspensibility |
| --- | --- |
| Example Formulation | 99.71% |
| Comparative Example 1 | 85.50% |
| Comparative Example 2 | 85.95% |
| Comparative Example 3 | 70.77% |
| Comparative Example 4 | 66.16% |
| Comparative Example 5 | 53.37% |

The results in Table 8 show that the structured surfactant formulation of the present technology achieved suspensibility of 99.71%. The comparative example formulations, which are examples of prior art structured surfactant formulations, had suspensibility of only about 85% or less.

Example 6: Field Trial Results

Two different structured Atrazine suspension concentrate formulations, a neutral pH formulation and a low pH formulation were prepared. The structured Atrazine suspension concentrates were tested for efficacy against three weed varieties, redroot pigweed, velvet leaf, and tall waterhemp in field trials along with a neutral pH commercial control standard pesticide and a low pH control formulation containing xanthan gum as a rheology modifier. The pH of the formulation may have an effect on the efficacy of the active ingredient; therefore, both low and neutral pH formulations

TABLE 7

| Component | Example Structured Surfactant Formulation | Comparative Examples | | | | |
| --- | --- | --- | --- | --- | --- | --- |
| | | 1 | 2 | 3 | 4 | 5 |
| C9-11 Alcohol ethoxylate (2.5 EO) | 4.3% | | | | | |
| Tristyrylphenol ethoxylate phosphate ester | 4.3% | | | | | |
| EO/PO Block copolymer | 3.0% | | | | | |
| Propylene glycol | 5.0% | | | | | |
| Atrazine | 42.63% | | | 30% | 30% | 16% |
| Chlorothalonil | | 40% | 40% | | | |
| AMMONYX ® LO | | 2.5% | 8.4% | | | |
| Alcohol ethoxylate C12-14 2EO | | 3.4% | 3.4% | | | |
| Linear alkyl diethanolamine | | | | 1.3% | 1.3% | |
| coconut dimethanolamine | | | | 5.0% | 5.0% | |
| Na lauryl 3 mole ethoxy sulfate | | | | 0.57% | 0.57% | |
| NaHCO3 | | | | 4.6 | 4.6 | |
| Silicone defoamer | .2 | | | 0.1 | 0.1 | 0.2 |
| triethanolamine Salt of C10-C12 alkylbenzene sulfonic acid (70% w/w aqueous solution) | | | | | | 19.55 |
| Oleic acid | | | | | | 5.03 |
| Water | 40.57 | 54% | 48.2 | 58.43 | 58.45 | 59.22 | were tested to examine any potential influences on the efficacy of the Atrazine. The samples were evaluated at two application rates, comparing initial control (seven days after application) vs. residual control (twenty-eight days after application). The results of the testing are shown in Table 10 and are reported as average % control. The results were assessed using ANOVA testing at a 95% confidence interval. Comparative test results shown with the same letter (a, a) indicate the results were not significantly different. Comparative results shown with different letters (b, a) indicate the results were significantly different. The two structured suspension concentrates are shown in Table 9.

TABLE 9

| Component | Wt. % |
|---|---|
| Neutral SSL | |
| Atrazine | 44.35 |
| SAG 1572 | 0.20 |
| Water | 37.66 |
| Ammonyx ® LO | 2.48 |
| Toximul ® 8323 | 1.66 |
| Glycerin | 5.00 |
| Step-Flow ® 4000 | 4.50 |
| Bio-Soft ® N25-3 | 4.15 |
| Low pH SSL | |
| Atrazine | 44.84 |
| SAG 1572 | 0.20 |
| Water | 38.36 |
| Toximul ® 8320 | 3.00 |
| Propylene Glycol | 5.00 |
| Stepfac ™ TSP-PE | 4.30 |
| Bio-Soft ® N91-2.5 | 4.30 |

The Table 10 field testing results show that the structured Atrazine formulations provided similar or improved performance compared to the commercial standard and xanthan gum control formulation for the three weed varieties at both low and neutral pH's.

A formulation was prepared in which the structured KIPA Glyphosate system was used to suspend a water-insoluble pesticide active, Atrazine. The structured KIPA Glyphosate system with suspended Atrazine was tested for efficacy against two grass weed varieties, Giant Foxtail and Barnyard grass; and four broadleaf weed varieties, Ivy-leaved Morning-glory, Redroot Pigweed, Velvet Leaf and Tall Waterhemp in field trials. A control was also prepared in which a commercial KIPA Glyphosate product was tank-mixed with a commercial Atrazine product, adjusted to match the active ingredient percentages in the structured system formulation. The samples were evaluated at two application rates, comparing initial control (seven days after application) vs. residual control (twenty-eight days after application). The results of the testing are shown in Table 12. The structured KIPA Glyphosate system with suspended Atrazine formulation is shown in Table 11.

TABLE 11

| Component | Wt. % |
|---|---|
| Atrazine | 15.00 |
| Step-Flow ® 26F | 3.00 |
| Stepfac ™ TSP-PE | 1.00 |
| Water | 24.8 |
| SAG 1572 | 0.2 |
| Ammonyx ® LO | 5.65 |
| Bio-Soft ® N91-2.5 | 2.85 |
| KIPA Glyphosate (47%) | 47.50 |

TABLE 10

| 32 fl oz/A | Pigweed | | | | Tall Waterhemp | | | | Velvetleaf | | | |
|---|---|---|---|---|---|---|---|---|---|---|---|---|
| | Initial Control | | Residual Control | | Initial Control | | Residual Control | | Initial Control | | Residual Control | |
| Neutral Atrazine Control | 55 | a | 26 | a | 30 | a | 13 | a | 25 | b | 53 | a |
| Neutral Atrazine SSL | 49 | a | 36 | a | 41 | a | 28 | a | 40 | a | 52 | a |

| 64 fl oz/A | Pigweed | | | | Tall Waterhemp | | | | Velvetleaf | | | |
|---|---|---|---|---|---|---|---|---|---|---|---|---|
| | Initial Control | | Residual Control | | Initial Control | | Residual Control | | Initial Control | | Residual Control | |
| Neutral Atrazine Commercial | 75 | a | 44 | a | 76 | a | 33 | a | 66 | a | 56 | a |
| Neutral Atrazine SSL | 78 | a | 65 | a | 75 | a | 51 | a | 70 | a | 55 | a |

| 32 fl oz/A | Pigweed | | | | Tall Waterhemp | | | | Velvetleaf | | | |
|---|---|---|---|---|---|---|---|---|---|---|---|---|
| | Initial Control | | Residual Control | | Initial Control | | Residual Control | | Initial Control | | Residual Control | |
| Low pH Atrazine Control | 63 | a | 24 | a | 46 | a | 10 | a | 24 | a | 48 | a |
| Low pH Atrazine SSL | 65 | a | 42 | a | 44 | a | 26 | a | 15 | a | 54 | a |

| 64 fl oz/A | Pigweed | | | | Tall Waterhemp | | | | Velvetleaf | | | |
|---|---|---|---|---|---|---|---|---|---|---|---|---|
| | Initial Control | | Residual Control | | Initial Control | | Residual Control | | Initial Control | | Residual Control | |
| Low pH Atrazine Control | 75 | a | 68 | a | 73 | b | 27 | b | 62 | b | 48 | a |
| Low pH Atrazine SSL | 82 | a | 77 | a | 85 | a | 76 | a | 75 | a | 64 | a |

TABLE 12

| 12 fl oz/A | Giant Foxtail | | | | Barnyard | | | |
|---|---|---|---|---|---|---|---|---|
| | Initial Control | | Residual Control | | Initial Control | | Residual Control | |
| Commercial KIPA Glyphosate with Commercial Atrazine Control | 89 | a | 100 | a | 41 | a | 7 | a |
| Glyphosate + Atrazine SSL | 94 | a | 98 | a | 39 | a | 8 | a |

| 48.5 fl oz/A | Giant Foxtail | | | | Barnyard | | | |
|---|---|---|---|---|---|---|---|---|
| | Initial Control | | Residual Control | | Initial Control | | Residual Control | |
| Commercial KIPA Glyphosate with Commercial Atrazine Control | 96 | a | 100 | a | 73 | a | 82 | a |
| Glyphosate + Atrazine SSL | 97 | a | 100 | a | 72 | a | 86 | a |

Broadleaf:

| 12 fl oz/A | Ivy-leaf Morning glory | | | | Redroot Pigweed | | | | Velvet Leaf | | | | Tall Waterhemp | | | |
|---|---|---|---|---|---|---|---|---|---|---|---|---|---|---|---|---|
| | Initial Control | | Residual Control | | Initial Control | | Residual Control | | Initial Control | | Residual Control | | Initial Control | | Residual Control | |
| Commercial KIPA Glyphosate with Commercial Atrazine Control | 56 | a | 11 | a | 95 | a | 96 | a | 16 | a | 15 | a | 10 | a | 8 | a |
| Glyphosate + Atrazine SSL | 58 | a | 17 | a | 94 | a | 98 | a | 18 | a | 21 | a | 14 | a | 10 | a |

| 48.5 fl oz/A | Ivy-leaf Morning glory | | | | Redroot Pigweed | | | | Velvet Leaf | | | | Tall Waterhemp | | | |
|---|---|---|---|---|---|---|---|---|---|---|---|---|---|---|---|---|
| | Initial Control | | Residual Control | | Initial Control | | Residual Control | | Initial Control | | Residual Control | | Initial Control | | Residual Control | |
| Commercial KIPA Glyphosate with Commercial Atrazine Control | 75 | a | 77 | a | 97 | a | 99 | a | 72 | a | 76 | b | 64 | a | 58 | b |
| Glyphosate + Atrazine SSL | 80 | a | 85 | a | 98 | a | 98 | a | 75 | a | 85 | a | 67 | a | 65 | a |

The Table 12 field testing results show that the structured KIPA Glyphosate system with suspended Atrazine provided similar or improved performance compared to the tank-mixed commercial KIPA Glyphosate and commercial Atrazine control for both grass and broadleaf weed varieties.

Example 7: Low pH Evaluation

This example evaluated the effect of a lower pH on the rheological properties of a structured surfactant pesticide composition and a control formulation comprising xanthan gum as a rheological modifier. Three structured surfactant pesticide formulations were prepared using the components and amounts shown in Table 13.

TABLE 13

| Component | wt % |
|---|---|
| Carbaryl | 42.87 |
| Tristyrylphenol phosphate ester | 4.3 |
| SAG 1572 | 0.2 |
| Propylene glycol | 5 |
| EO/PO Block Copolymer | 3 |
| C9-11 Alcohol ethoxylate 2.5 EO | 4.3 |
| Water | q.s. to 100% |

Figure 7:
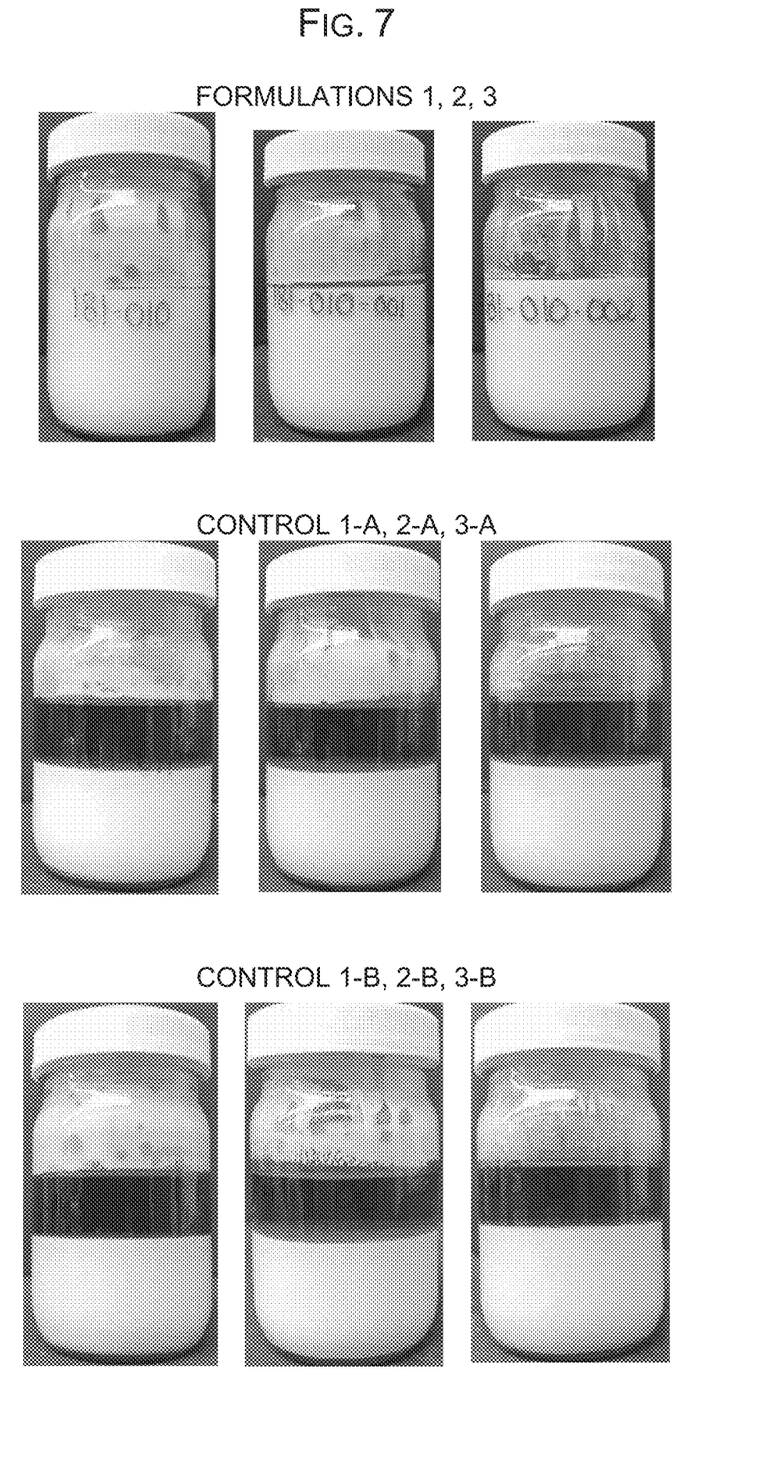
FIG. 7 shows photographs of the results of elevated temperature stability testing on structured surfactant formulations and conventional formulations comprising xanthan gum at different pH values.

The formulations were prepared by a method similar to Example 1. Formulation 1 had no adjustment to the pH and had a pH of 4.23. For Formulations 2 and 3, phosphoric acid was added to the formulations to adjust the pH to 3.09 and 2.38, respectively. The control formulations 1, 2, 3 series A and B were prepared without the low HLB surfactant (C9-11 Alcohol Ethoxylate 2.5 EO) but adding 0.2% of Kelzan® S (series A) and Kelzan® ASX (series B) and the pH was adjusted to values similar to those of Formulations 1, 2 and 3. Kelzan® ASX is a specific grade of Xanthan Gum intended to have a better stability at low pH. Each formulation was evaluated for elevated temperature stability testing in a 54° C. oven for two weeks. Results reported in Table 14 and shown in FIG. 7 showed little to no separation in the formulations containing the structured surfactant system, while those containing xanthan gum and acid-stable xanthan gum showed significant separation in the samples at all three pH levels. The xanthan-containing samples also were found to have packing, which is a change in density of the formulation indicating the lack of homogeneity of the active ingredient. When packed, the formulation requires more force during agitation to completely homogenize the sample again.

TABLE 14

| Composition | pH 1% aq. | separation, % after 2 weeks at 54° C. | Comments |
|---|---|---|---|
| Formulation 1 | 4.23 | 0.0 | no packing |
| Formulation 2 | 3.09 | 6.8 | some soft packing |
| Formulation 3 | 2.38 | 0.0 | no packing |
| Control 1-A | 4.46 | 38.3 | hard packing |
| Control 2-A | 3.16 | 36.2 | hard packing |
| Control 3-A | 2.35 | 36.7 | hard packing |
| Control 1-B | 4.27 | 37.0 | hard packing |
| Control 2-B | 3.11 | 37.0 | hard packing |
| Control 3-B | 2.37 | 33.3 | hard packing |

The test results show that in some embodiments, the compositions of the present technology have temperature stability even at lower pH values. The agricultural compositions of the present technology can be further illustrated by the following examples, where all percentages are by weight based on total weight.

Example 8

| Ingredient | Atrazine with Rapeseed Oil |
|---|---|
| Atrazine | 29.5 |
| SAG 1572 | 0.20 |
| Toximul ® 8320 | 3.00 |
| Makon ® TSP-60 | 2.25 |
| BioSoft ® N23-3 | 4.80 |
| Propylene Glycol | 5.00 |
| Rapeseed Oil | 20.00 |
| Steposol ® SB-W | 5.00 |
| Water | q.s. to 100% |

Example 9

| Ingredient | Diuron with Rapeseed Oil |
|---|---|
| Diuron | 30.60 |
| SAG 1572 | 0.20 |
| Toximul ® 8320 | 3.00 |
| Makon ® TSP-60 | 2.40 |
| BioSoft ® N23-3 | 4.65 |
| Propylene Glycol | 5.00 |
| Rapeseed Oil | 20.00 |
| Steposol ® SB-W | 5.00 |
| Water | q.s. to 100% |

The Example 8 and 9 compositions formed stable structured surfactant systems that suspended both the pesticide active and the rapeseed oil.

The suspensibility of the Example 8 formulation was compared to two control suspension concentrate (SC) formulations thickened with Xanthan gum, with results displayed below in Table 15. The first of these controls utilizes just one of the structuring surfactants as a dispersant in the formulation, whereas the second utilizes a more common dispersant for such formulations.

TABLE 15

| Ingredient | Example Structured Surfactant Formulation | Control Formulation 1 | Control Formulation 2 |
|---|---|---|---|
| Atrazine | 29.5 | 29.5 | 29.5 |
| Makon ®TSP-60 | 2.25 | 1.67 | |
| Bio-Soft ® N23-3 | 4.80 | | |
| Propylene Glycol | 5.0 | 5.0 | 5.0 |
| Rapeseed Oil | 20.0 | 20.0 | 20.0 |
| SAG 1572 | 0.2 | 0.23 | 0.23 |
| Toximul ® 8320 | 3.0 | 3.0 | 3.0 |
| Steposol ® SB-W | 5.0 | 5.0 | 5.0 |
| Xanthan Gum | | 10.0 | 10.0 |
| Stepfac ™ TSP-PE | | | 1.67 |
| Water | q.s. to 100% | q.s. to 100% | q.s. to 100% |

Suspensibility of these formulations was evaluated initially as well as after five freeze/thaw cycles and after two weeks at 54° C. The results are shown below in Table 16:

TABLE 16

| Formulation | Initial Suspensibility | Two weeks at 54° C. | 5 Freeze/Thaw Cycles |
|---|---|---|---|
| Example Structured Surfactant Formulation | 99.88% | 99.33% | 100% |
| Control 1 | 96.91% | 95.12% | Unable to test: Formulation became thick like cottage cheese |
| Control 2 | 99.99% | 100% | Unable to test: Formulation became thick like cottage cheese |

The results in Table 16 show that, although the Control formulations had acceptable to very good suspensibility initially as well as after two weeks at 54° C., the systems were unstable and unable to be evaluated after five freeze/thaw cycles, while the structured system was both stable and exhibited excellent suspensibility.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. An agricultural composition comprising a structured electrolyte system, wherein the structured electrolyte system comprises:
   (a) water;
   (b) from about 5% to about 30% by weight of an electrolyte selected from the group consisting of water soluble pesticide salts, water-soluble fertilizers, micronutrients, biostimulants and combinations thereof; and
   (c) from about 5% to about 35% by weight of a mixture of surfactants, wherein the mixture of surfactants consists of at least one high HLB surfactant having an HLB value of greater than 10, and at least one low HLB surfactant having an HLB value of 9 or less, wherein the high HLB surfactant is selected from the group consisting of alkyl amine oxides, alkyl phosphate esters, alkyl alkoxylate phosphate esters, arylalkoxylate phosphate esters, arylalkoxylates, alkyl sulfates, alkyl ether sulfates, sulfosuccinates, EO/PO alkoxylates, fatty alcohol ethoxylates, fatty acid ethoxylates, ethoxylated triglycerides, alkylbetaines, alkylamidopropylbetaines, sorbitan esters, sorbitan ester ethoxylates, salts of dodecylbenzene sulfonate, and mixtures thereof, and the low HLB surfactant is selected from the group consisting of fatty alcohols, fatty alcohol ethoxylates, fatty acid amides, and mixtures thereof, wherein the high HLB surfactant and the low HLB surfactant are present in an amount and at a weight ratio effective to form the structured electrolyte system.

2. The agricultural composition of claim 1, wherein the water soluble pesticide salt is at least one salt of Glyphosate.

3. The agricultural composition of claim 1, wherein the electrolyte is a fertilizer.

4. The agricultural composition of claim 1, further comprising at least one water insoluble or sparingly water soluble pesticide stably suspended in the structured electrolyte system.

5. The agricultural composition of claim 1, further comprising at least one non-aqueous adjuvant stably suspended in the structured electrolyte system.

6. The agricultural composition of claim 1, wherein the low HLB surfactant comprises an alcohol ethoxylate having a carbon chain length of 9 to 13 carbon atoms and 2-3 moles of ethylene oxide, and the high HLB surfactant is an alkyl amine oxide having 8-22 carbon atoms in the alkyl chain, tristyrylphenol ethoxylate phosphate ester, tristyrylphenol ethoxylate, or a combination of alkyl amine oxide and tristyrylphenol ethoxylate phosphate ester.

7. The agricultural composition of claim 1, wherein the composition has a suspensibility of at least 90%.

8. The agricultural composition of claim 1, wherein the weight ratio of high HLB surfactant to low HLB surfactant is in the range of 4:1 to 1:4.

* * * * *